(12) United States Patent
Dokai

(10) Patent No.: US 8,878,739 B2
(45) Date of Patent: Nov. 4, 2014

(54) WIRELESS COMMUNICATION DEVICE

(71) Applicant: Murata Manufacturing Co., Ltd., Nagaokakyo (JP)

(72) Inventor: Yuya Dokai, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/970,633

(22) Filed: Aug. 20, 2013

(65) Prior Publication Data

US 2013/0335281 A1     Dec. 19, 2013

Related U.S. Application Data

(63) Continuation of application No. PCT/JP2012/067779, filed on Jul. 12, 2012.

(30) Foreign Application Priority Data

Jul. 14, 2011   (JP) .................................. 2011-155294

(51) Int. Cl.
| | |
|---|---|
| *H01Q 1/48* | (2006.01) |
| *H01Q 9/06* | (2006.01) |
| *H01Q 1/38* | (2006.01) |
| *H01Q 1/22* | (2006.01) |
| *H01Q 7/00* | (2006.01) |
| *H04B 5/00* | (2006.01) |

(52) U.S. Cl.
CPC . *H01Q 9/06* (2013.01); *H01Q 1/48* (2013.01); *H04B 5/0075* (2013.01); *H01Q 1/38* (2013.01); *H04B 5/0062* (2013.01); *H01Q 1/2225* (2013.01); *H01Q 7/00* (2013.01)

USPC .......................................... 343/748; 343/860

(58) Field of Classification Search
CPC . H01Q 1/2283; H01Q 1/2208; H01Q 1/2225; H01Q 9/06; H04B 5/0062; H04B 5/0075
USPC ......................................................... 343/748
See application file for complete search history.

(56) References Cited

U.S. PATENT DOCUMENTS

| | | | |
|---|---|---|---|
| 3,364,564 | A | 1/1968 | Kurtz et al. |
| 4,794,397 | A | 12/1988 | Ohe et al. |

(Continued)

FOREIGN PATENT DOCUMENTS

| | | |
|---|---|---|
| CA | 2 279 176 A1 | 7/1998 |
| DE | 10 2006 057 369 A1 | 6/2008 |

(Continued)

OTHER PUBLICATIONS

Official communication issued in Japanese Application No. 2007-531524, mailed on Sep. 11, 2007.

(Continued)

*Primary Examiner* — Dameon E Levi
*Assistant Examiner* — Jennifer F Hu
(74) *Attorney, Agent, or Firm* — Keating & Bennett, LLP

(57) ABSTRACT

A wireless communication device includes a wireless IC device, a multilayer substrate including a stack of a plurality of dielectric layers, a resonant circuit that is connected to the wireless IC device and that includes a capacitance element provided in the multilayer substrate and an inductance element provided outside the multilayer substrate, and a radiation conductor connected to the resonant circuit.

9 Claims, 6 Drawing Sheets

(56) References Cited

U.S. PATENT DOCUMENTS

| | | |
|---|---|---|
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,243,045 B1 | 6/2001 | Ishibashi |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,956,481 B1 | 10/2005 | Cole |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2001/0000987 A1 | 5/2001 | Sakai |
| 2001/0011012 A1 | 8/2001 | Hino et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2002/0186004 A1 | 12/2002 | Prazeres da Costa et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2003/0206095 A1 | 11/2003 | Chaloner et al. |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0001031 A1 | 1/2005 | Akiho et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0133605 A1 | 6/2005 | Koyama et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0253726 A1 | 11/2005 | Yoshida et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0114159 A1 | 6/2006 | Yoshikawa et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0208900 A1 | 9/2006 | Tavassoli Hozouri |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0015549 A1 | 1/2007 | Hernandez et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200705 A1 | 8/2007 | Yamagajo et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0252770 A1 | 11/2007 | Kai et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0074268 A1 | 3/2008 | Shafer |
| 2008/0087990 A1 | 4/2008 | Kato et al. |
| 2008/0111695 A1 | 5/2008 | Yamagajo et al. |
| 2008/0129606 A1 | 6/2008 | Yanagisawa et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0272885 A1 | 11/2008 | Atherton |
| 2009/0002130 A1 | 1/2009 | Kato |
| 2009/0009007 A1 | 1/2009 | Kato et al. |
| 2009/0021352 A1 | 1/2009 | Kataya et al. |
| 2009/0021446 A1* | 1/2009 | Kataya et al. ................ 343/860 |
| 2009/0065594 A1* | 3/2009 | Kato et al. ................... 235/492 |
| 2009/0066466 A1 | 3/2009 | Arimura |
| 2009/0080296 A1 | 3/2009 | Dokai et al. |
| 2009/0096696 A1 | 4/2009 | Joyce, Jr. et al. |
| 2009/0109034 A1 | 4/2009 | Chen et al. |
| 2009/0109102 A1 | 4/2009 | Dokai et al. |
| 2009/0134979 A1 | 5/2009 | Tsukamoto et al. |
| 2009/0140947 A1 | 6/2009 | Sasagawa et al. |
| 2009/0160719 A1 | 6/2009 | Kato et al. |
| 2009/0174527 A1 | 7/2009 | Stewart |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 | 10/2009 | Ikemoto et al. |
| 2009/0278687 A1 | 11/2009 | Kato |
| 2009/0284220 A1 | 11/2009 | Toncich et al. |

(56) References Cited

U.S. PATENT DOCUMENTS

| | | |
|---|---|---|
| 2009/0321527 A1 | 12/2009 | Kato et al. |
| 2010/0103058 A1 | 4/2010 | Kato et al. |
| 2010/0182210 A1 | 7/2010 | Ryou et al. |
| 2010/0283694 A1 | 11/2010 | Kato |
| 2010/0308118 A1 | 12/2010 | Kataya et al. |
| 2011/0031320 A1 | 2/2011 | Kato et al. |
| 2011/0063184 A1 | 3/2011 | Furumura et al. |
| 2011/0186641 A1 | 8/2011 | Kato et al. |
| 2011/0199713 A1 | 8/2011 | Kato et al. |
| 2011/0253795 A1 | 10/2011 | Kato |
| 2012/0229345 A1 | 9/2012 | Takaki et al. |

FOREIGN PATENT DOCUMENTS

| | | |
|---|---|---|
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |
| EP | 1 701 296 A1 | 9/2006 |
| EP | 1 703 589 A1 | 9/2006 |
| EP | 1 742 296 A1 | 1/2007 |
| EP | 1 744 398 A1 | 1/2007 |
| EP | 1 840 802 A1 | 10/2007 |
| EP | 1 841 005 A1 | 10/2007 |
| EP | 1 865 574 A1 | 12/2007 |
| EP | 1 887 652 A1 | 2/2008 |
| EP | 1 976 056 A1 | 10/2008 |
| EP | 1 988 491 A1 | 11/2008 |
| EP | 1 988 601 A1 | 11/2008 |
| EP | 1 993 170 A1 | 11/2008 |
| EP | 2 009 738 A1 | 12/2008 |
| EP | 2 012 258 A1 | 1/2009 |
| EP | 2 056 400 A1 | 5/2009 |
| EP | 2 096 709 A1 | 9/2009 |
| EP | 2 148 449 A1 | 1/2010 |
| EP | 2 166 617 A1 | 3/2010 |
| EP | 2 251 934 A1 | 11/2010 |
| EP | 2 256 861 A1 | 12/2010 |
| EP | 2 306 588 A1 | 4/2011 |
| EP | 2 330 684 A1 | 6/2011 |
| GB | 2 305 075 A | 3/1997 |
| GB | 2461443 A | 1/2010 |
| JP | 50-143451 A | 11/1975 |
| JP | 61-284102 A | 12/1986 |
| JP | 62-127140 U | 8/1987 |
| JP | 01-212035 A | 8/1989 |
| JP | 02-164105 A | 6/1990 |
| JP | 02-256208 A | 10/1990 |
| JP | 3-171385 A | 7/1991 |
| JP | 03-503467 A | 8/1991 |
| JP | 03-262313 A | 11/1991 |
| JP | 04-150011 A | 5/1992 |
| JP | 04-167500 A | 6/1992 |
| JP | 04-096814 U | 8/1992 |
| JP | 04-101168 U | 9/1992 |
| JP | 04-134807 U | 12/1992 |
| JP | 05-226926 A | 9/1993 |
| JP | 05-327331 A | 12/1993 |
| JP | 6-53733 A | 2/1994 |
| JP | 06-077729 A | 3/1994 |
| JP | 06-029215 U | 4/1994 |
| JP | 06-177635 A | 6/1994 |
| JP | 6-260949 A | 9/1994 |
| JP | 07-183836 A | 7/1995 |
| JP | 08-055725 A | 2/1996 |
| JP | 08-056113 A | 2/1996 |
| JP | 8-87580 A | 4/1996 |
| JP | 08-88586 A | 4/1996 |
| JP | 08-088586 A | 4/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 09-093029 A | 4/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 09-284038 A | 10/1997 |
| JP | 09-294374 A | 11/1997 |
| JP | 9-512367 A | 12/1997 |
| JP | 10-069533 A | 3/1998 |
| JP | 10-69533 A | 3/1998 |
| JP | 10-084406 A | 3/1998 |
| JP | 10-505466 A | 5/1998 |
| JP | 10-171954 A | 6/1998 |
| JP | 10-173427 A | 6/1998 |
| JP | 10-193849 A | 7/1998 |
| JP | 10-193851 A | 7/1998 |
| JP | 10-242742 A | 9/1998 |
| JP | 10-293828 A | 11/1998 |
| JP | 10-334203 A | 12/1998 |
| JP | 11-025244 A | 1/1999 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149537 A | 6/1999 |
| JP | 11-149538 A | 6/1999 |
| JP | 11-175678 A | 7/1999 |
| JP | 11-219420 A | 8/1999 |
| JP | 11-220319 A | 8/1999 |
| JP | 11-282993 A | 10/1999 |
| JP | 11-328352 A | 11/1999 |
| JP | 11-331014 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-022421 A | 1/2000 |
| JP | 2000-048152 A | 2/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-311226 A | 11/2000 |
| JP | 2000-321984 A | 11/2000 |
| JP | 2000-349680 A | 12/2000 |
| JP | 2001-10264 A | 1/2001 |

(56) References Cited

FOREIGN PATENT DOCUMENTS

| | | |
|---|---|---|
| JP | 2001-028036 A | 1/2001 |
| JP | 2001-043340 A | 2/2001 |
| JP | 3075400 U | 2/2001 |
| JP | 2001-66990 A | 3/2001 |
| JP | 2001-76111 A | 3/2001 |
| JP | 2001-084463 A | 3/2001 |
| JP | 2001-101369 A | 4/2001 |
| JP | 2001-505682 A | 4/2001 |
| JP | 2001-168628 A | 6/2001 |
| JP | 2001-188890 A | 7/2001 |
| JP | 2001-209767 A | 8/2001 |
| JP | 2001-240046 A | 9/2001 |
| JP | 2001-240217 A | 9/2001 |
| JP | 2001-256457 A | 9/2001 |
| JP | 2001-257292 A | 9/2001 |
| JP | 2001-514777 A | 9/2001 |
| JP | 2001-291181 A | 10/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351083 A | 12/2001 |
| JP | 2001-351084 A | 12/2001 |
| JP | 2001-352176 A | 12/2001 |
| JP | 2001-358527 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-042083 A | 2/2002 |
| JP | 2002-063557 A | 2/2002 |
| JP | 2002-505645 A | 2/2002 |
| JP | 2002-076750 A | 3/2002 |
| JP | 2002-76750 A | 3/2002 |
| JP | 2002-111363 A | 4/2002 |
| JP | 2002-143826 A | 5/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-175920 A | 6/2002 |
| JP | 2002-183676 A | 6/2002 |
| JP | 2002-183690 A | 6/2002 |
| JP | 2002-185358 A | 6/2002 |
| JP | 2002-204117 A | 7/2002 |
| JP | 2002-521757 A | 7/2002 |
| JP | 2002-522849 A | 7/2002 |
| JP | 2002-222398 A | 8/2002 |
| JP | 2002-230128 A | 8/2002 |
| JP | 2002-232221 A | 8/2002 |
| JP | 2002-246828 A | 8/2002 |
| JP | 2002-252117 A | 9/2002 |
| JP | 2002-259934 A | 9/2002 |
| JP | 2002-280821 A | 9/2002 |
| JP | 2002-290130 A | 10/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-325013 A | 11/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-022912 A | 1/2003 |
| JP | 2003-026177 A | 1/2003 |
| JP | 2003-030612 A | 1/2003 |
| JP | 2003-037861 A | 2/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099184 A | 4/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-139866 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-308363 A | 10/2003 |
| JP | 2003-309418 A | 10/2003 |
| JP | 2003-317055 A | 11/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-096618 A | 3/2004 |
| JP | 2004-506905 A | 3/2004 |
| JP | 2004-104344 A | 4/2004 |
| JP | 2004-121412 A | 4/2004 |
| JP | 2004-126750 A | 4/2004 |
| JP | 2004-127230 A | 4/2004 |
| JP | 2004-140513 A | 5/2004 |
| JP | 2004-145449 A | 5/2004 |
| JP | 2004-163134 A | 6/2004 |
| JP | 2004-166176 A | 6/2004 |
| JP | 2004-213582 A | 7/2004 |
| JP | 2004-519916 A | 7/2004 |
| JP | 2004/070879 | 8/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-282403 A | 10/2004 |
| JP | 2004-287767 A | 10/2004 |
| JP | 2004-295297 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |

(56) References Cited

FOREIGN PATENT DOCUMENTS

| | | |
|---|---|---|
| JP | 2004-362602 A | 12/2004 |
| JP | 2005-5866 A | 1/2005 |
| JP | 2005-18156 A | 1/2005 |
| JP | 2005-033461 A | 2/2005 |
| JP | 2005-050581 A | 2/2005 |
| JP | 2005-064799 A | 3/2005 |
| JP | 2005-124061 A | 5/2005 |
| JP | 2005-128592 A | 5/2005 |
| JP | 2005-129019 A | 5/2005 |
| JP | 2005-134942 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-192124 A | 7/2005 |
| JP | 2005-202943 A | 7/2005 |
| JP | 2005-204038 A | 7/2005 |
| JP | 2005-210223 A | 8/2005 |
| JP | 2005-210676 A | 8/2005 |
| JP | 2005-210680 A | 8/2005 |
| JP | 2005-217822 A | 8/2005 |
| JP | 2005-229474 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-277579 A | 10/2005 |
| JP | 2005-284352 A | 10/2005 |
| JP | 2005-284455 A | 10/2005 |
| JP | 2005-293537 A | 10/2005 |
| JP | 2005-295135 A | 10/2005 |
| JP | 2005-306696 A | 11/2005 |
| JP | 2005-311205 A | 11/2005 |
| JP | 2005-321305 A | 11/2005 |
| JP | 2005-322119 A | 11/2005 |
| JP | 2005-327622 A | 11/2005 |
| JP | 2005-328259 A | 11/2005 |
| JP | 2005-333244 A | 12/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-013976 A | 1/2006 |
| JP | 2006-025390 A | 1/2006 |
| JP | 2006-031766 A | 2/2006 |
| JP | 2006-033312 A | 2/2006 |
| JP | 2006-39902 A | 2/2006 |
| JP | 2006-039947 A | 2/2006 |
| JP | 2006-42059 A | 2/2006 |
| JP | 2006-42097 A | 2/2006 |
| JP | 2006-050200 A | 2/2006 |
| JP | 2006-053833 A | 2/2006 |
| JP | 2006-67479 A | 3/2006 |
| JP | 2006-72706 A | 3/2006 |
| JP | 2006-074348 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-238282 A | 9/2006 |
| JP | 2006-246372 A | 9/2006 |
| JP | 2006-270212 A | 10/2006 |
| JP | 2006-270681 A | 10/2006 |
| JP | 2006-270766 A | 10/2006 |
| JP | 2006-285911 A | 10/2006 |
| JP | 2006-287659 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-013120 A | 1/2007 |
| JP | 2007-13120 A | 1/2007 |
| JP | 2007-18067 A | 1/2007 |
| JP | 2007-019905 A | 1/2007 |
| JP | 2007-28002 A | 2/2007 |
| JP | 2007-040702 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096655 A | 4/2007 |
| JP | 2007-096768 A | 4/2007 |
| JP | 2007-102348 A | 4/2007 |
| JP | 2007-116347 A | 5/2007 |
| JP | 2007-122542 A | 5/2007 |
| JP | 2007-149757 A | 6/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-166133 A | 6/2007 |
| JP | 3975918 B2 | 6/2007 |
| JP | 2007-172369 A | 7/2007 |
| JP | 2007-172527 A | 7/2007 |
| JP | 2007-524942 A | 8/2007 |
| JP | 2007-228254 A | 9/2007 |
| JP | 2007-228325 A | 9/2007 |
| JP | 2007-228437 A | 9/2007 |
| JP | 2007-233597 A | 9/2007 |
| JP | 2007-241789 A | 9/2007 |
| JP | 2007-249620 A | 9/2007 |
| JP | 2007-266999 A | 10/2007 |
| JP | 2007-272264 A | 10/2007 |
| JP | 2007-279782 A | 10/2007 |
| JP | 2007-287128 A | 11/2007 |
| JP | 2007-295177 A | 11/2007 |
| JP | 2007-295395 A | 11/2007 |
| JP | 2007-295557 A | 11/2007 |
| JP | 2007-312350 A | 11/2007 |
| JP | 2007-324865 A | 12/2007 |
| JP | 2008-033716 A | 2/2008 |
| JP | 2008-042910 A | 2/2008 |
| JP | 2008-72243 A | 3/2008 |
| JP | 2008-083867 A | 4/2008 |
| JP | 2008-092131 A | 4/2008 |
| JP | 2008-097426 A | 4/2008 |
| JP | 2008-098993 A | 4/2008 |
| JP | 4069958 B2 | 4/2008 |
| JP | 2008-103691 A | 5/2008 |
| JP | 2008-107947 A | 5/2008 |
| JP | 2008-513888 A | 5/2008 |
| JP | 2008-148345 A | 6/2008 |
| JP | 2008-519347 A | 6/2008 |
| JP | 2008-160821 A | 7/2008 |
| JP | 2008-160874 A | 7/2008 |
| JP | 2008-167190 A | 7/2008 |
| JP | 2008-182438 A | 8/2008 |
| JP | 2008-197714 A | 8/2008 |
| JP | 2008-535372 A | 8/2008 |
| JP | 2008-207875 A | 9/2008 |
| JP | 2008-211572 A | 9/2008 |
| JP | 2008-217406 A | 9/2008 |

(56) References Cited

FOREIGN PATENT DOCUMENTS

| | | |
|---|---|---|
| JP | 2008-226099 A | 9/2008 |
| JP | 2008-252517 A | 10/2008 |
| JP | 2008-288915 A | 11/2008 |
| JP | 2008-294491 A | 12/2008 |
| JP | 2009-017284 A | 1/2009 |
| JP | 2009-021970 A | 1/2009 |
| JP | 2009-25870 A | 2/2009 |
| JP | 2009-027291 A | 2/2009 |
| JP | 2009-27291 A | 2/2009 |
| JP | 2009-037413 A | 2/2009 |
| JP | 2009-044647 A | 2/2009 |
| JP | 2009-044715 A | 2/2009 |
| JP | 3148168 U | 2/2009 |
| JP | 2009-065426 A | 3/2009 |
| JP | 2009-110144 A | 5/2009 |
| JP | 2009-111986 A | 5/2009 |
| JP | 2009-130896 A | 6/2009 |
| JP | 2009-135166 A | 6/2009 |
| JP | 2009-524363 A | 6/2009 |
| JP | 2009-153166 A | 7/2009 |
| JP | 4301346 B2 | 7/2009 |
| JP | 2009-181246 A | 8/2009 |
| JP | 2009-182630 A | 8/2009 |
| JP | 2009-213169 A | 9/2009 |
| JP | 2009-213171 A | 9/2009 |
| JP | 2009-260758 A | 11/2009 |
| JP | 2009-284182 A | 12/2009 |
| JP | 2010-009196 A | 1/2010 |
| JP | 2010-015342 A | 1/2010 |
| JP | 2010-504598 A | 2/2010 |
| JP | 2010-050844 A | 3/2010 |
| JP | 2010-051017 A | 3/2010 |
| JP | 2010-081571 | 4/2010 |
| JP | 4535209 B2 | 9/2010 |
| JP | 2011-015395 A | 1/2011 |
| JP | 4609604 B2 | 1/2011 |
| JP | 2011-205384 A | 10/2011 |
| JP | 2012-033021 A | 2/2012 |
| NL | 9100176 A | 3/1992 |
| NL | 9100347 A | 3/1992 |
| WO | 98/33142 A1 | 7/1998 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A2 | 4/2004 |
| WO | 2004/070879 A | 8/2004 |
| WO | 2004/072892 A2 | 8/2004 |
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/049068 A1 | 5/2006 |
| WO | 2006/114821 A1 | 11/2006 |
| WO | 2007/013576 A1 | 2/2007 |
| WO | 2007/083574 A1 | 7/2007 |
| WO | 2007/083575 A1 | 7/2007 |
| WO | 2007/086130 A1 | 8/2007 |
| WO | 2007/094494 A1 | 8/2007 |
| WO | 2007/097385 A1 | 8/2007 |
| WO | 2007/099602 A1 | 9/2007 |
| WO | 2007/100092 A1 | 9/2007 |
| WO | 2007/102360 A1 | 9/2007 |
| WO | 2007/105348 A1 | 9/2007 |
| WO | 2007/119310 A1 | 10/2007 |
| WO | 2007/125683 A1 | 11/2007 |
| WO | 2007/132094 A1 | 11/2007 |
| WO | 2007/138857 A1 | 12/2007 |
| WO | 2008/001561 A1 | 1/2008 |
| WO | 2008/007606 A | 1/2008 |
| WO | 2008/081699 A1 | 7/2008 |
| WO | 2008/126458 A1 | 10/2008 |
| WO | 2008/133018 A1 | 11/2008 |
| WO | 2008/140037 A1 | 11/2008 |
| WO | 2008/142957 A1 | 11/2008 |
| WO | 2009/008296 A1 | 1/2009 |
| WO | 2009/011144 A1 | 1/2009 |
| WO | 2009/011154 A1 | 1/2009 |
| WO | 2009/011376 A1 | 1/2009 |
| WO | 2009/011400 A1 | 1/2009 |
| WO | 2009/011423 A1 | 1/2009 |
| WO | 2009/048767 A1 | 4/2009 |
| WO | 2009/081719 A1 | 7/2009 |
| WO | 2009/110381 A1 | 9/2009 |
| WO | 2009/119548 A1 | 10/2009 |
| WO | 2009/128437 A1 | 10/2009 |
| WO | 2009/140220 A1 | 11/2009 |
| WO | 2009/142114 A1 | 11/2009 |
| WO | 2010/026939 A1 | 3/2010 |
| WO | 2010/050361 A1 | 5/2010 |
| WO | 2010/079830 A1 | 7/2010 |
| WO | 2010/082413 A1 | 7/2010 |
| WO | 2010/119854 A1 | 10/2010 |
| WO | 2011/062274 A1 | 5/2011 |

OTHER PUBLICATIONS

Official communication issued in Japanese Application No. 2007-531525, mailed on Sep. 25, 2007.

Official communication issued in Japanese Application No. 2007-531524, mailed on Dec. 12, 2007.

Official communication issued in European Application No. 07706650.4, mailed on Nov. 24, 2008.

Mukku-Sha, "Musen IC Tagu Katsuyo-no Subete" "(All About Wireless IC Tags"), RFID, pp. 112-126.

Dokai et al.: "Wireless IC Device and Component for Wireless IC Device"; U.S. Appl. No. 11/624,382, filed Jan. 18, 2007.

Dokai et al.: "Wireless IC Device, and Component for Wireless IC Device"; U.S. Appl. No. 11/930,818, filed Oct. 31, 2007.

Kato et al.: "Wireless IC Device"; U.S. Appl. No. 12/042,399, filed Mar. 5, 2008.

Official communication issued in related U.S. Appl. No. 12/042,399; mailed on Aug. 25, 2008.

Official communication issued in counterpart European Application No. 08 77 7758, dated on Jun. 30, 2009.

Official communication issued in counterpart Japanese Application No. 2008-103741, mailed on May 26, 2009.

Official communication issued in counterpart Japanese Application No. 2008-103742, mailed on May 26, 2009.

Official communication issued in International Application No. PCT/JP2008/050358, mailed on Mar. 25, 2008.

Official communication issued in International Application No. PCT/JP2008/050356, mailed on Mar. 25, 2008.

Osamura et al.: "Packaging Material With Electromagnetic Coupling Module," U.S. Appl. No. 12/536,669, filed Aug. 6, 2009.

Dokai et al.: "Wireless IC Device and Component for Wireless IC Device," U.S. Appl. No. 12/543,553, filed Aug. 19, 2009.

Shioya et al.: "Wireless IC Device," U.S. Appl. No. 12/551,037, filed Aug. 31, 2009.

Ikemoto: "Wireless IC Device and Manufacturing Method Thereof," U.S. Appl. No. 12/579,672, filed Oct. 15, 2009.

Official communication issued in International Application No. PCT/JP2008/058614, mailed on Jun. 10, 2008.

Official communication issued in counterpart International Application No. PCT/JP2008/071502, mailed Feb. 24, 2009.

Kato et al.: "Wireless IC Device and Manufacturing Method Thereof,"; U.S. Appl. No. 12/432,854, filed Apr. 30, 2009.

Official communication issued in counterpart International Application No. PCT/JP2008/058168, mailed Aug. 12, 2008.

Official communication issued in counterpart International Application No. PCT/JP2008/062886, mailed Oct. 21, 2008.

Kato et al.: "Wireless IC Device," U.S. Appl. No. 12/469,896, filed May 21, 2009.

Ikemoto et al.: "Wireless IC Device," U.S. Appl. No. 12/496,709, filed Jul. 2, 2009.

(56) References Cited

OTHER PUBLICATIONS

Official communication issued in counterpart International Application No. PCT/JP2008/062947, mailed Aug. 19, 2008.
Official communication issued in counterpart International Application No. PCT/JP2008/055567, mailed May 20, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless Ic Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 121861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in corresponding Japanese Patent Application No. 2013-523974, mailed on Jul. 30, 2013.
Official Communication issued in corresponding European Patent Application No. 12810908.9, mailed on May 26, 2014.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.

(56) References Cited

OTHER PUBLICATIONS

Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2012/050557, mailed on Apr. 10, 2012.
Kimura et al.: "Wireless Communication Device"; U.S. Appl. No. 13/789,761, filed Mar. 8, 2013.
Dokai et al.: "RFID Chip Package and RFID Tag"; U.S. Appl. No. 13/792,650, filed Mar. 11, 2013.
Kato et al.: "Wireless IC Device Component and Wireless IC Device"; U.S. Appl. No. 13/794,929, filed Mar. 12, 2013.
Kato et al.: "Wireless IC Device Component and Wireless IC Device"; U.S. Appl. No. 13/848,748, filed Mar. 22, 2013.
Official Communication issued in International Patent Application No. PCT/JP2012/080493, mailed on Dec. 25, 2012.
Mukai et al.: "Inspection Method and Inspection Device for RFID Tag"; U.S. Appl. No. 13/933,184, filed Jul. 2, 2013.
Kato et al.: "Antenna Device and Method of Setting Resonant Frequency of Antenna Device"; U.S. Appl. No. 13/941,760, filed Jul. 15, 2013.
Kato et al.: "Antenna Device and Method of Setting Resonant Frequency of Antenna Device"; U.S. Appl. No. 13/943,973, filed Jul. 17, 2013.
Official Communication issued in International Patent Application No. PCT/JP2012/080700, mailed on Jan. 15, 2013.
Mukai et al.: "Wireless Integrated Circuit Device and Method of Manufacturing the Same"; U.S. Appl. No. 13/961,995, filed Aug. 8, 2013.
Kato et al.: "Radio IC Device"; U.S. Appl. No. 13/964,234, filed Aug. 12, 2013.
Official Communication issued in International Patent Application No. PCT/JP2012/067779, mailed on Aug. 28, 2012.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.
Kato et al.: "Wireless IC Device and Component for Wireless IC Device"; U.S. Appl. No. 12/339,198, filed Dec. 19, 2008.

Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Kato: "Wireless IC Device"; U.S. Appl. No. 12/789,610, filed May 28, 2010.
Kato: "Antenna and RFID Device"; U.S. Appl. No. 13/472,520, filed May 16, 2012.
Kato et al.: "Wireless IC Device and Component for Wireless IC Device"; U.S. Appl. No. 13/540,694, filed Jul. 3, 2012.
Dokai et al.: "Wireless IC Device and Component for Wireless IC Device"; U.S. Appl. No. 13/567,108, filed Aug. 6, 2012.
Dokai et al.: "Wireless IC Device and Component for Wireless IC Device"; U.S. Appl. No. 13/567,109, filed Aug. 6, 2012.
Official Communication issued in International Patent Application No. PCT/JP2011/052594, mailed on May 17, 2011.
Kato et al.: "Wireless IC Device"; U.S. Appl. No. 13/585,866, filed Aug. 15, 2012.
Kato et al.: "Radio Communication Device and Radio Communication Terminal"; U.S. Appl. No. 13/600,256, filed Aug. 31, 2012.
Murayama et al.: "Wireless Communication Module and Wireless Communication Device"; U.S. Appl. No. 13/598,872, filed Aug. 30, 2012.
Official Communication issued in International Patent Application No. PCT/JP2011/069689, mailed on Oct. 4, 2011.
Official Communication issued in corresponding Japanese Patent Application No. 2011-552116, mailed on Apr. 17, 2012.
Tsubaki et al.: "RFID Module and RFID Device"; U.S. Appl. No. 13/603,627, filed Sep. 5, 2012.
Kato et al.: "Antenna Device and Method of Setting Resonant Frequency of Antenna Device"; U.S. Appl. No. 13/604,807, filed Sep. 6, 2012.
Kato et al.: "Antenna Device and Method of Setting Resonant Frequency of Antenna Device"; U.S. Appl. No. 13/604,801, filed Sep. 6, 2012.
Official Communication issued in International Patent Application No. PCT/JP2011/053656, mailed on May 17, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.

(56) References Cited

OTHER PUBLICATIONS

Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "Radio Frequency IC Device"; U.S. Appl. No. 13/163,803, filed Jun. 20, 2011.
Dokai et al.: "Wireless IC Device"; U.S. Appl. No. 13/099,392, filed May 3, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official Communication issued in International Patent Application No. PCT/JP2011/068110, mailed on Sep. 20, 2011.
Dokai et al.: "Antenna and Wireless Communication Device"; U.S. Appl. No. 13/613,021, filed Sep. 13, 2012.
Takeoka et al.: "Printed Wiring Board and Wireless Communication System"; U.S. Appl. No. 13/616,140, filed Sep. 14, 2012.
Dokai: "Wireless IC Device, Wireless IC Module and Method of Manufacturing Wireless IC Module"; U.S. Appl. No. 13/688,287, filed Nov. 29, 2012.
Official Communication issued in International Patent Application No. PCT/JP2011/067127, mailed on Oct. 18, 2011.
Kato et al.: "Wireless Communication Device and Metal Article"; U.S. Appl. No. 13/691,996, filed Dec. 3, 2012.
Yosui: "Antenna Apparatus and Communication Terminal Instrument"; U.S. Appl. No. 13/706,409, filed Dec. 6. 2012.
Official Communication issued in International Patent Application No. PCT/JP2011/071795, mailed on Dec. 27, 2011.
Dokai et al.: "Wireless IC Device"; U.S. Appl. No. 13/738,143, filed Jan. 10, 2013.
Official Communication issued in International Patent Application No. PCT/JP2011/074009, mailed on Dec. 20, 2011.
Kato et al.: "Electromagnetic-Coupling-Module-Attached Article"; U.S. Appl. No. 13/754,972, filed Jan. 31, 2013.
Kimura et al.: "Electrical Product"; U.S. Appl. No. 13/757,991, filed Feb. 4, 2013.
Nakano et al.: "Communication Terminal Device"; U.S. Appl. No. 13/760,196, filed Feb. 6, 2013.
Official Communication issued in International Patent Application No. PCT/JP2011/073054, mailed on Dec. 20, 2011.
Official Communication issued in International Patent Application No. PCT/JP2011/073490, mailed on Jan. 10, 2012.
Kato et al.: "Antenna Device and Communication Terminal Apparatus"; U.S. Appl. No. 13/761,195, filed Feb. 7, 2013.
Kato et al.: "Antenna Device and Mobile Communication Terminal"; U.S. Appl. No. 13/767,960, filed Feb. 15, 2013.
Official Communication issued in International Patent Application No. PCT/JP2012/058884, mailed on Jun. 12, 2012.
Dokai et al.: "Wireless Communication Device"; U.S. Appl. No. 13/782,346, filed Mar. 1, 2013.
Official Communication issued in International Patent Application No. PCT/JP2012/053344, mailed on May 22, 2012.

* cited by examiner

F I G. 4 A
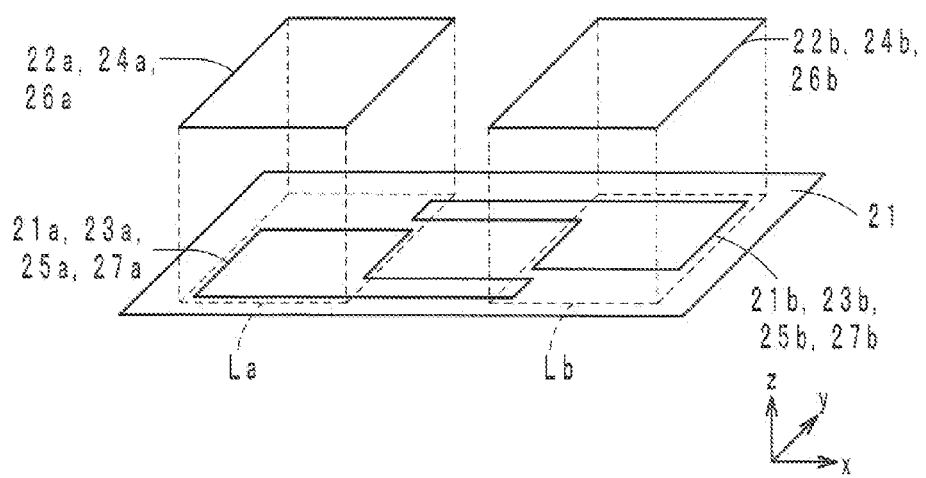
F I G. 4 B
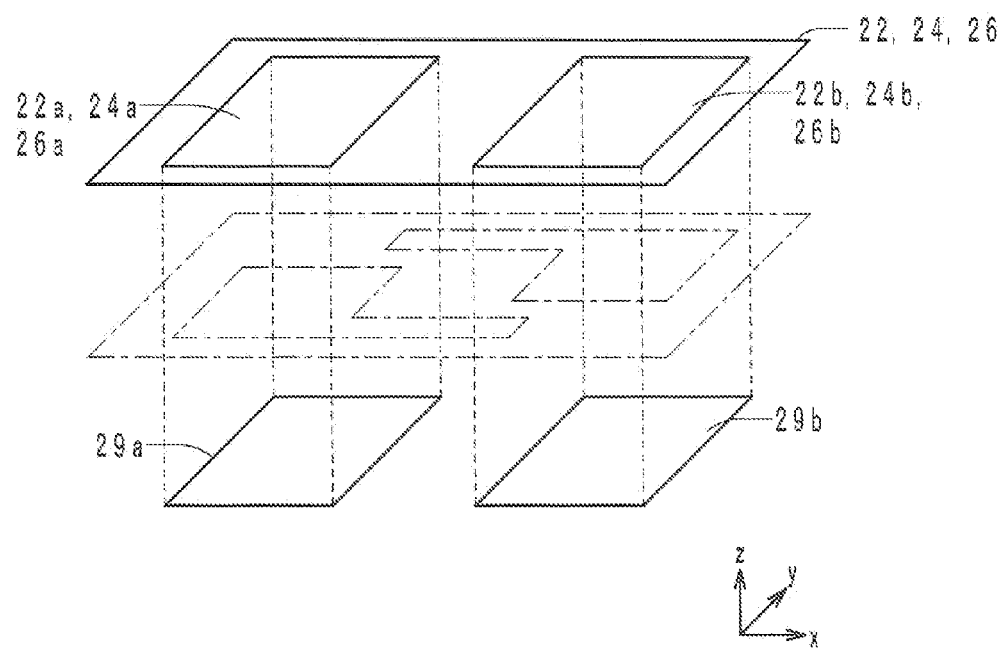

F I G. 5
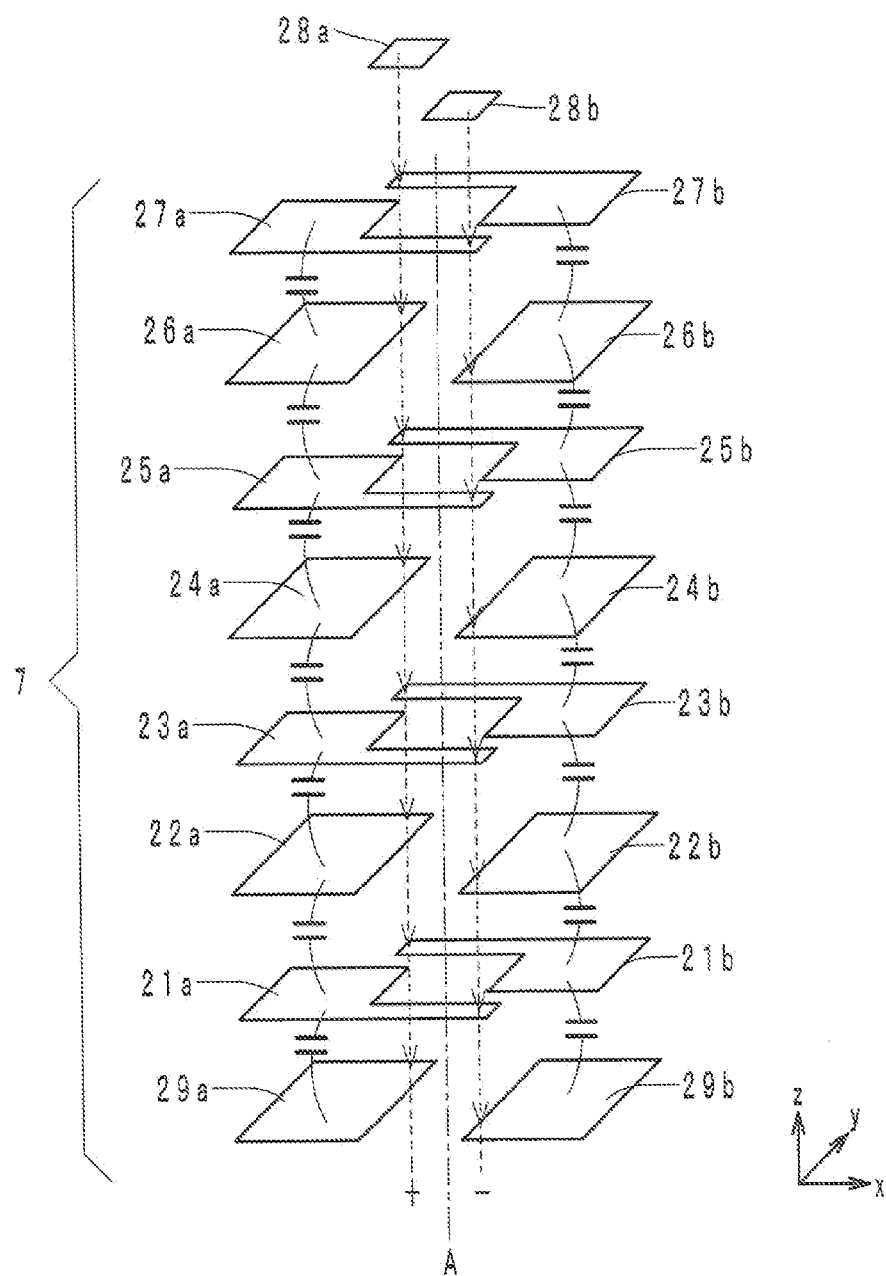

WIRELESS COMMUNICATION DEVICE

This application claims priority to Japanese Patent Application No. 2011-155294 filed on Jul. 14, 2011 and International Patent Application No. PCT/JP2012/067779 filed on Jul. 12, 2012, the entire disclosures of which are incorporated herein by reference.

BACKGROUND OF THE INVENTION

1. Field of the Invention

The present invention relates to a wireless communication device including a resonant circuit connected to a wireless IC device and a radiation conductor connected to the resonant circuit.

2. Description of the Related Art

Recently, radio frequency identification (RFID) systems have been used for various applications such as commodity management. An RFID system includes a reader/writer and an RFID tag. To transmit information to each other through non-contact communication, a reader/writer and an RFID tag each include a wireless IC device (i.e., RFID IC chip) and a radiation conductor (i.e., antenna).

When information is to be transmitted, the wireless IC device modulates a carrier by using information that is to be transmitted, generates a high frequency signal, and outputs the generated high frequency signal to the radiation conductor. The radiation conductor transmits (i.e., radiates) the received high frequency signal to a communication target. When information is to be received, the radiation conductor receives a high frequency signal from a communication target, and outputs it to the wireless IC device. The wireless IC device reproduces information from the received high frequency signal.

In known techniques, examples of the RFID tag described above include wireless communication devices described in Japanese Patent No. 4301346 and Japanese Patent No. 4535209. In Japanese Patent No. 4301346 and Japanese Patent No. 4535209, a wireless communication device includes an electromagnetic coupling module and a printed wiring circuit board on which a loop-shaped electrode is formed. The electromagnetic coupling module includes a wireless IC device and a feeder circuit substrate on which the wireless IC device is mounted. The feeder circuit substrate is a multilayer substrate having a plurality of dielectric layers stacked one on top of another. Coil patterns constituting an inductance element and electrode patterns constituting a capacitance element are formed in the multilayer substrate. The inductance element and the capacitance element form a resonant circuit having a resonant frequency corresponding to a carrier frequency. The electromagnetic coupling module is mounted on the printed wiring circuit board, and is electrically connected to the loop-shaped electrode.

However, in the above-described wireless communication device, the coil patterns (pattern conductors) are formed in the multilayer substrate, resulting in a first problem in that loss caused by a material of the pattern conductors or dielectric substrates is apt to increase. Especially when the size of the multilayer substrate is to be reduced, it is necessary, for example, to narrow the line width of a coil pattern in order to obtain a desired inductance value, causing the insertion loss to be further increased.

The above-described wireless communication device has a second problem in that misalignment of a dielectric layer causes variations in the capacitance of the capacitance element in the multilayer substrate.

SUMMARY OF THE INVENTION

Therefore, preferred embodiments of the present invention provide a wireless communication device which enables insertion loss to be reduced and provide a wireless communication device which makes it difficult for variations in capacitance to occur even when a dielectric layer is misaligned.

According to a first aspect of a preferred embodiment of the present invention, a wireless communication device includes a wireless IC device, a multilayer substrate including a stack of a plurality of dielectric layers, a resonant circuit connected to the wireless IC device, and a radiation conductor connected to the resonant circuit. The resonant circuit includes a capacitance element provided inside the multilayer substrate, and an inductance element provided outside the multilayer substrate.

According to a second aspect of a preferred embodiment of the present invention, a wireless communication device includes a wireless IC device, a multilayer substrate including a stack of a plurality of dielectric layers, a resonant circuit connected to the wireless IC device, and a radiation conductor connected to the resonant circuit. The resonant circuit includes an inductance element and a capacitance element. The capacitance element is provided in the multilayer substrate.

In the second aspect, the capacitance element includes first and second electrode patterns located on at least one layer of the dielectric layers, and third and fourth electrode patterns that are located on at least another layer of the dielectric layers and that are opposite to the first and second electrode patterns. The first and fourth electrode patterns have an identical potential, and the second and third electrode patterns have an identical potential. In a plan view in a stacking direction of the dielectric layers, an outline of one of the first and third electrode patterns is located inside an outline of the other, and an outline of one of the second and fourth electrode patterns is located inside an outline of the other.

According to the above-described first aspect, a wireless communication device can be provided which enables insertion loss to be significantly reduced or prevented.

According to the above-described second aspect, a wireless communication device can be provided which makes it difficult for variation in capacitance to occur even when a dielectric layer is misaligned.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a schematic diagram illustrating the relationship among the dimensions of first, second, third and fourth electrode patterns illustrated in FIG. 3.

FIG. 4B is a schematic diagram illustrating the relationship between the dimensions of the first and second electrode patterns and the dimensions of first and second external electrodes illustrated in FIG. 3.

FIG. 5 is a schematic diagram illustrating capacitance elements located in the multilayer substrate in FIG. 1A.

DETAILED DESCRIPTION OF THE PREFERRED EMBODIMENTS

For convenience of description below, arrows x, y, and z used in some of the drawings are defined. The arrows x and y indicate the left-right direction and the front-back direction of a wireless communication device, respectively. The arrow z indicates the up-down direction of the wireless communication device, and also indicates the stacking direction of a multilayer substrate.

Referring to FIGS. 1A to 5, a wireless communication device 100 according to a preferred embodiment of the present invention will be described in detail. The wireless communication device 100 preferably is, for example, an RFID tag used in a UHF band RFID system. A carrier frequency in 900 MHz band is used in a UHF band RFID system. A UHF band RFID system has characteristics of having a long communication distance and being capable of simultaneously reading out pieces of information of multiple RFID tags. Therefore, a UHF band RFID system has been a promising system for commodity management. The wireless communication device 100 and a wireless communication device 500 each are not limited to an RFID tag used in a UHF band RFID system, and may be an RFID tag used in an RFID system using another frequency band, such as the HF band (13 MHz band) or the 2.4 GHz band.

Figure 1A:
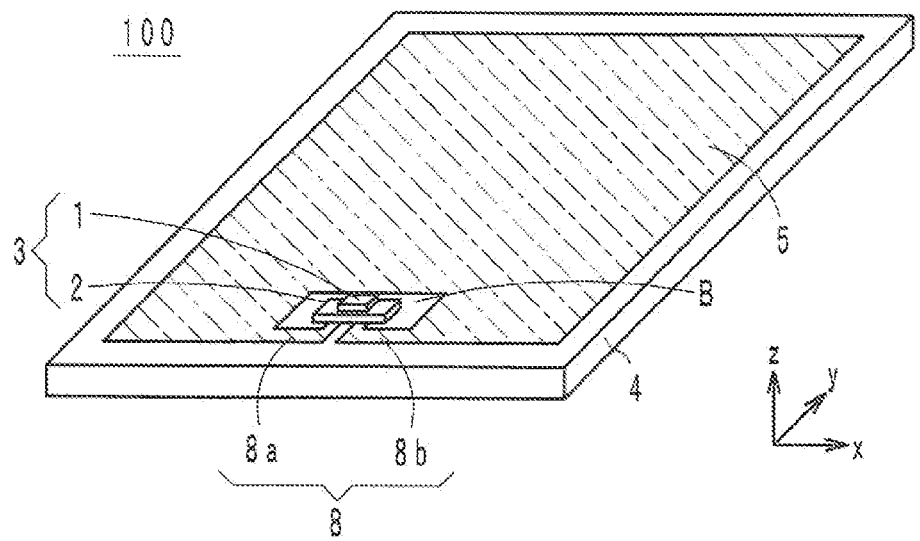
FIG. 1A is a perspective view illustrating a wireless communication device according to a preferred embodiment of the present invention.
Figure 1B:
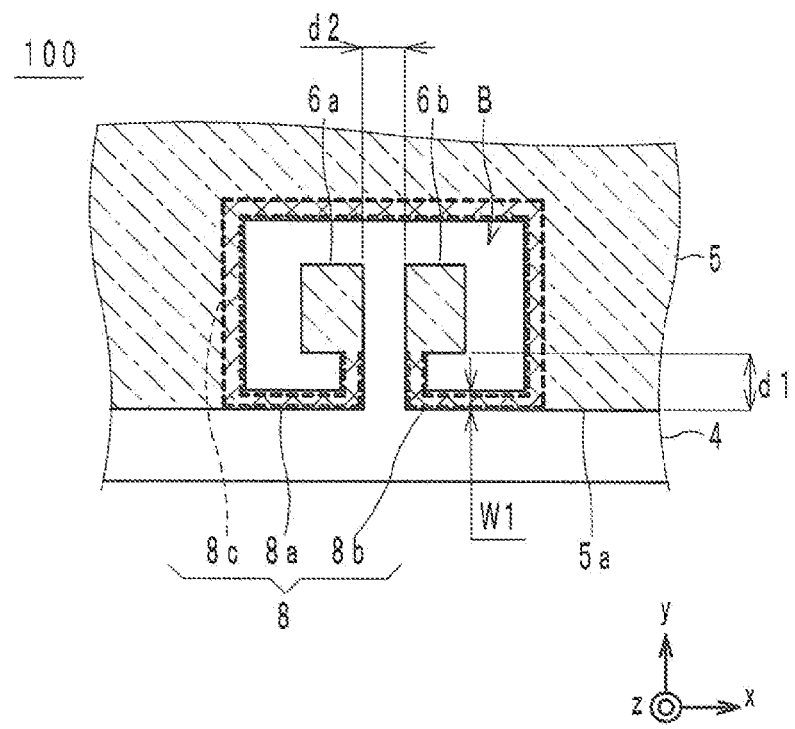
FIG. 1B is an enlarged view of a principal portion of the wireless communication device in FIG. 1A, viewed in a stacking direction.

The wireless communication device 100 is preferably configured as an RFID tag, and can be installed in various communication terminals including a cellular phone, for example. To perform non-contact communication so as to exchange information with, for example, a reader/writer, the wireless communication device 100 roughly includes a feeding device 3 including a wireless IC device 1 and a multilayer substrate 2, a printed circuit board (hereinafter, referred to as a PCB) 4, a radiation conductor (that is, antenna conductor) 5, first and second land electrodes 6a and 6b, and an inductance element 8, as illustrated in FIGS. 1A and 1B. For the sake of convenience, the land electrodes 6a and 6b are not illustrated in FIG. 1A, and the feeding device 3 is not illustrated in FIG. 1B.

Figure 2:
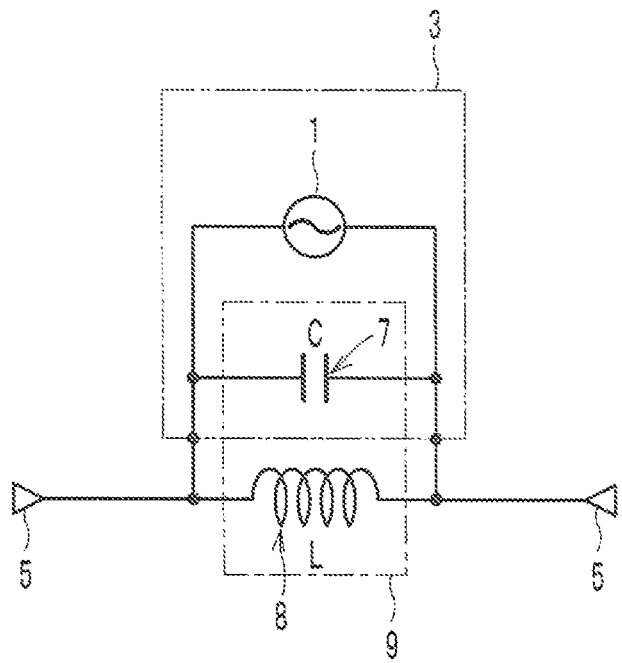
FIG. 2 is an equivalent circuit diagram of the wireless communication device in FIG. 1A.

As illustrated in FIG. 2, the wireless communication device 100 illustrated as an equivalent circuit includes the wireless IC device 1, radiation conductors 5, and a resonant circuit 9 including a capacitance element 7 and the inductance element 8.

The wireless IC device 1 is an integrated circuit device (RFID IC chip) that processes a high frequency signal received/transmitted in an RFID system, and includes a logic circuit and a memory circuit. This integrated circuit device is a chip type element formed of, for example, a silicon semiconductor. As the wireless IC device 1, a packaged device installed on or embedded in a substrate, such as a ceramic substrate or a resin substrate, may be used, or a bare chip may be used.

When information is to be transmitted, the wireless IC device 1 modulates a carrier having a 900 MHz band frequency by using the information that is to be transmitted, generates a high frequency signal, and outputs it to the resonant circuit 9. A high frequency signal is preferably a differential signal. The wireless IC device 1 is connected to the radiation conductor 5 described below. Preferably, a differential transmission path is used for the connection. A differential transmission path is constituted by a line for transmission of a positive-phase signal and a line for transmission of a reverse-phase signal whose phase is different from that of the positive-phase signal by 180°. To output a positive-phase signal and a reverse-phase signal, first and second external electrodes (not illustrated) are provided on the back surface of the wireless IC device 1. Further, two non-contact (NC) terminals (not illustrated) are provided on the back surface of the wireless IC device 1. When information is to be received, the wireless IC device 1 receives a high frequency signal in 900 MHz band via the radiation conductors 5, and demodulates the received signal so as to obtain predetermined information.

The multilayer substrate 2 is a stack including a plurality of dielectric layers stacked one on top of another. Each of the dielectric layers preferably has the same or substantially the same rectangular shape. The dielectric layers preferably are dielectric ceramic layers such as low temperature co-fired ceramics (LTCC) layers, for example. Alternatively, the stack may include a plurality of dielectric resin layers, such as those composed of thermosetting resin or thermoplastic resin, stacked one on top of another, for example. The detailed structure of the multilayer substrate 2 will be described below with reference to FIG. 3.

Figure 3:
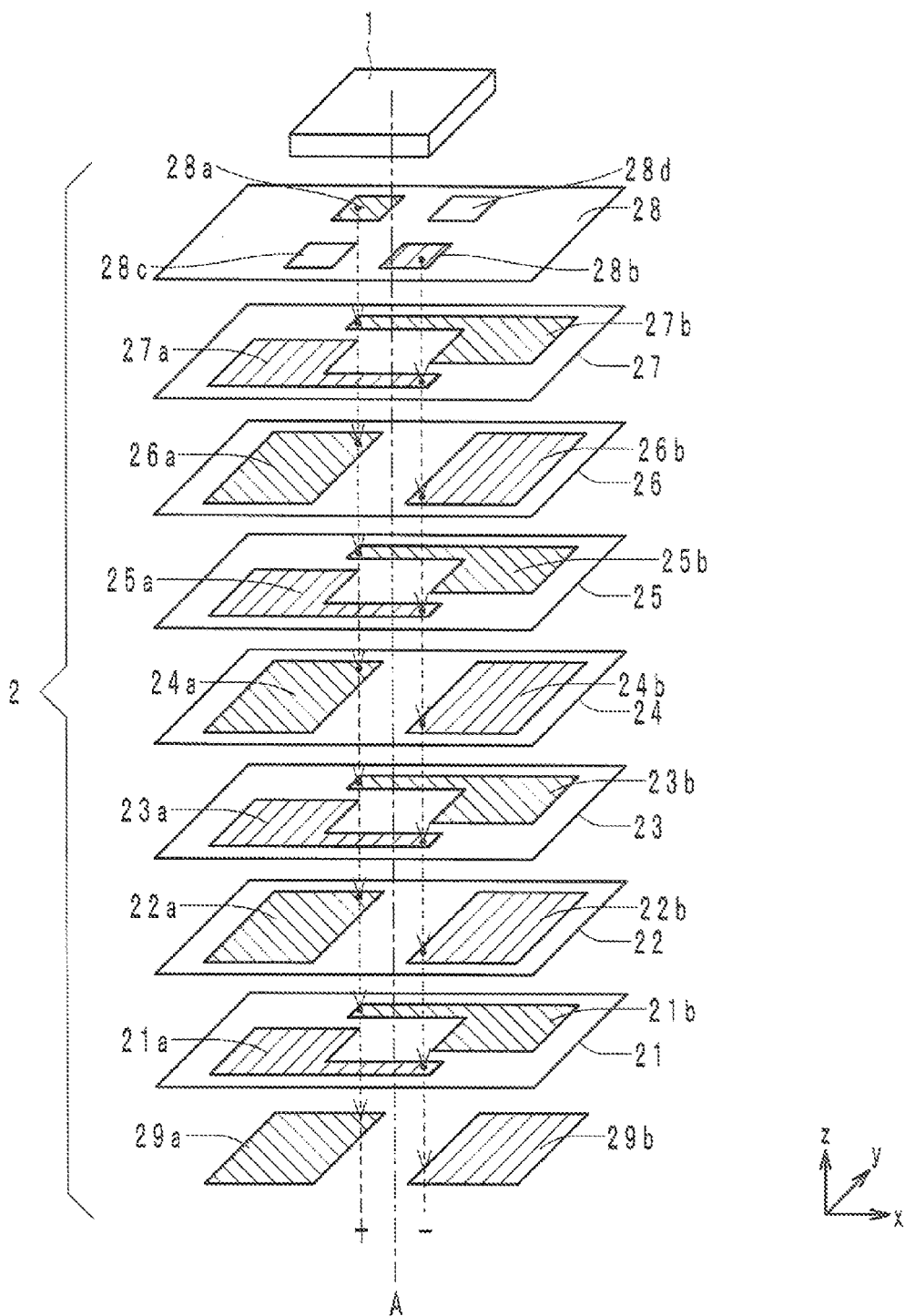
FIG. 3 is an exploded perspective view of a multilayer substrate in FIG. 1A.

FIG. 3 illustrates an example in which eight dielectric layers, dielectric layers 21 to 28, are present. Each of the dielectric layers 21 to 28 preferably has the same or substantially the same rectangular or substantially rectangular shape. The dielectric layer 21 is the lowest layer (the first layer). The dielectric layer 22 is stacked on the principal surface (in the present preferred embodiment, the top surface) of the dielectric layer 21. Similarly, each of the dielectric layers 23 to 28 is stacked on the principal surface of the closest lower layer of the dielectric layers 22 to 27. The dielectric layer 28 is the topmost layer (the eighth layer). For convenience of description below, a reference character A is assigned to an intersection point of two diagonal lines of each of the above-described principal surfaces. To prevent FIG. 3 from being complicated, the intersection points A are represented by a long dashed short dashed line.

First and second external electrodes 29a and 29b are provided on the opposite surface (in the present preferred embodiment, the bottom surface) parallel or substantially parallel to the principal surface in the dielectric layer 21, for example, through application of a conductive paste. These external electrodes 29a and 29b are used to connect the multilayer substrate 2 to the inductance element 8 on the PCB 4. The first external electrode 29a is located, for example, at a predetermined distance in the opposite direction of the arrow x from the intersection point A of the above-described opposite surface. The shape of the second external electrode 29b preferably is the same or substantially the same as a shape obtained when the first external electrode 29a is revolved by about 180° around the intersection point A of the above-described opposite surface.

Each of first electrode patterns 21a, 23a, 25a, and 27a is preferably formed through, for example, printing at the same or substantially the same position on the principal surface of a corresponding one of the dielectric layers 21, 23, 25, and 27. The electrode patterns 21a, 23a, 25a, and 27a are composed of a conducting material, and more specifically, of a conducting material having a small specific resistance and being mainly composed of silver, copper, or the like.

The above-described electrode patterns 21a, 23a, 25a, and 27a preferably have the same or substantially the same shape. More specifically, each of the electrode patterns 21a, 23a, 25a, and 27a has an electrode portion having a rectangular or substantially rectangular shape and a connecting conductor portion. An electrode portion is located at a predetermined distance in the opposite direction of the arrow x from the intersection point A of a corresponding principal surface. A connecting conductor portion extends in the forward direction of the arrow x from a corresponding electrode portion to a corresponding negative-pole-side via hole conductor (described below).

Further, each of second electrode patterns 21b, 23b, 25b, and 27b composed of the above-described conducting material is preferably formed through, for example, printing on the principal surface of a corresponding one of the dielectric layers 21, 23, 25, and 27. The shape of each of the electrode patterns 21b, 23b, 25b, and 27b preferably is the same or substantially the same as a shape obtained when a corresponding one of the electrode patterns 21a, 23a, 25a, and 27a is revolved by about 180° around the intersection point A of the corresponding principal surface. Therefore, each of the electrode patterns 21b, 23b, 25b, and 27b includes an electrode portion which is located at a predetermined distance in the forward direction of the arrow x from the intersection point A of a corresponding principal surface, and also includes a connecting conductor portion which extends in the opposite direction of the arrow x from a corresponding electrode portion to a corresponding positive-pole-side via hole conductor (described below).

Each of third electrode patterns 22a, 24a, and 26a composed of the above-described conducting material is preferably formed through, for example, printing at the same or substantially the same position on the principal surface of a corresponding one of the dielectric layers 22, 24, and 26. The electrode patterns 22a, 24a, and 26a preferably have the same or substantially the same shape. More specifically, each of the electrode patterns 22a, 24a, and 26a is constituted by an electrode portion having a rectangular or substantially rectangular shape. An electrode portion is located at a predetermined distance in the opposite direction of the arrow x from the intersection point A of a corresponding principal surface.

Further, each of fourth electrode patterns 22b, 24b, and 26b composed of the above-described conducting material is preferably formed through, for example, printing on the principal surface of a corresponding one of the dielectric layers 22, 24, and 26. The shape of each of the electrode patterns 22b, 24b, and 26b is preferably the same or substantially the same as a shape obtained when a corresponding one of the electrode patterns 22a, 24a, and 26a is revolved by about 180° around the intersection point A of the corresponding principal surface.

Referring to FIG. 4A, as described above, at the same or substantially the same position on the principal surfaces of the dielectric layers 21, 23, 25, and 27, the electrode patterns 21a, 23a, 25a, and 27a having substantially the same shape are formed at substantially the same position of the dielectric layers 21, 23, 25, and 27. Therefore, as illustrated in FIG. 4A, when the electrode patterns 21a, 23a, 25a, and 27a are projected on the principal surface of the dielectric layer 21 in the arrow z direction, that is, when these are viewed in plan view in the arrow z direction, the electrode portions of the electrode patterns 21a, 23a, 25a, and 27a match each other.

Similarly, when the electrode patterns 22a, 24a, and 26a are viewed in plan view in the arrow z direction, these patterns match each other. At the same or substantially the same position on the principal surfaces of the dielectric layers 22, 24, and 26, the electrode patterns 21a, 23a, 25a, and 27a having the same or substantially the same shape are formed at the same or substantially the same position of the dielectric layers 21, 23, 25, and 27.

In the present preferred embodiment, when the multilayer substrate 2 is viewed in plan view in the arrow z direction, the electrode patterns 21a to 27a are arranged so that the outlines of the electrode portions of the electrode patterns 21a, 23a, 25a, and 27a are present inside an outline La of the electrode patterns 22a, 24a, and 26a. In a similar plan view described above, the electrode portions of the electrode patterns 21b, 23b, 25b, and 27b are present inside an outline Lb of the electrode patterns 22b, 24b, and 26b. The positional relationship and the dimensions illustrated in FIG. 4A allow reduction in variation which occurs in the capacitance of the capacitance element 7 and which is caused by misalignments of the dielectric layers 21 to 27. Detailed description will be provided below.

Referring to FIG. 4B, the first external electrode 29a and the electrode patterns 22a, 24a, and 26a are arranged so that, when the multilayer substrate 2 is seen in plan view in the arrow z direction, the outlines of the electrode patterns 22a, 24a, and 26a match or substantially match the outline of the first external electrode 29a. In a similar plan view as described above, the outlines of the electrode patterns 22b, 24b, and 26b match or substantially match the outline of the second external electrode 29b. The positional relationship and the dimensions illustrated in FIG. 4B allow electric charge whose amount is equivalent to, for example, that between the electrode pattern 21a and the electrode pattern 22a to be accumulated between the first external electrode 29a and the electrode pattern 21a and between the second external electrode 29b and electrode pattern 21b. Detailed description will be provided below.

Referring back to FIG. 3, a first input-output terminal 28a, a second input-output terminal 28b, and two non-contact (NC) terminals 28c and 28d are located on the principal surface of the dielectric layer 28. These input-output terminals 28a and 28b and these NC terminals 28c and 28d composed of the above-described conducting material are preferably formed through, for example, printing. The first input-output terminal 28a and the second input-output terminal 28b have the point symmetry relationship using the intersection point A of the corresponding principal surface as the central point. The NC terminals 28c and 28d have a similar point symmetry relationship.

When the multilayer substrate 2 is viewed in plan view in the arrow z direction, the following portions overlap each other: the first input-output terminal 28a; an end portion of the connecting conductor of the electrode pattern 27b; a corner portion of the third electrode pattern 26a; an end portion of the connecting conductor of the electrode pattern 25b; a corner portion of the third electrode pattern 24a; an end portion of the connecting conductor of the electrode pattern 23b; a corner portion of the electrode pattern 22a; an end portion of the connecting conductor of the electrode pattern 21b; and a corner portion of the first external electrode 29a. To connect these overlapped portions electrically, a via hole is formed through the dielectric layers 21 to 28, and the via hole is filled with a conductor paste. Thus, a first via hole conductor is provided.

In a similar plan view as described above, the following portions overlap each other: the second input-output terminal 28b; an end portion of the connecting conductor of the electrode pattern 27a; a corner portion of the fourth electrode pattern 26b; an end portion of the connecting conductor of the electrode pattern 25a; a corner portion of the fourth electrode pattern 24b; an end portion of the connecting conductor of the electrode pattern 23a; a corner portion of the electrode pattern 22b; an end portion of the connecting conductor of the electrode pattern 21a; and a corner portion of the second external electrode 29b. A second via hole conductor is formed through the dielectric layers 21 to 28 so as to connect these portions electrically.

Hereinafter, the above-described first via hole conductor may be called a positive-pole-side via hole conductor. The above-described second via hole conductor may be called a negative-pole-side via hole conductor. These via hole conductors are represented by symbols ● without a reference character for convenience of illustration in FIG. 3.

The dielectric layers on which the above-described electrode patterns and the like are provided are stacked on top of one another through compression and then fired, such that the multilayer substrate 2 is formed. The wireless IC device 1 is mounted on the top surface of the multilayer substrate 2 thus obtained (that is, the principal surface of the dielectric layer 28). As described above, the wireless IC device 1 includes the first external electrode which outputs a positive-phase signal, the second external electrode which outputs a reverse-phase signal, and the two NC terminals. The first external electrode is connected to the first input-output terminal 28a through soldering or the like. The second external electrode is connected to the second input-output terminal 28b through soldering or the like. Each of the NC terminals of the wireless IC device 1 is connected to a corresponding one of the NC terminals of the multilayer substrate 2 through soldering or the like.

Referring to FIG. 5, the capacitance element 7 generally includes the electrode patterns 21a to 27a, the electrode patterns 21b to 27b, and the external electrodes 29a and 29b. The combination of the electrode patterns 21a to 27a and the first external electrode 29a and the combination of the electrode patterns 21b to 27b and the second external electrode 29b are symmetric in the forward and opposite direction of the arrow x, with respect to a line connecting the intersection points A. In this configuration, when the first input-output terminal 28a is supplied with a positive-phase signal and the second input-output terminal 28b is supplied with a reverse-phase signal, the same or substantially the same potential is present between the input-output terminal 28a and the external electrode 29a, and the same or substantially the same potential is present between the input-output terminal 28b and the external electrode 29b. A differential signal supplied to the input-output terminals 28a and 28b is output from the external electrodes 29a and 29b while it holds the phase relationship between the positive-phase signal and the reverse-phase signal.

Referring back to FIGS. 1A and 1B, the PCB 4 is a printed circuit board installed in the above-described communication terminal. In the PCB 4, various digital and analog circuits, such as a driving circuit for a display included in the communication terminal, a power supply circuit, and a high frequency circuit, are arranged. In addition, various electronic components constituting these digital and analog circuits are mounted in the PCB 4.

The ground conductor 5 for these electronic components is provided on the principal surface of the above-described PCB 4. The ground conductor 5 also serves as a radiation conductor (that is, antenna element) 5 of the wireless communication device 100. The radiation conductor 5 preferably has a rectangular or substantially rectangular shape. The outline of the radiation conductor 5 may be any shape other than a rectangular or substantially rectangular shape. The radiation conductor 5 may include a slit or an opening.

A cutout portion B having a predetermined shape is formed near an edge 5a of the radiation conductor 5 as described above. By using the cutout portion B, the first and second land electrodes 6a and 6b and the inductance element 8 which are included in the configuration of the wireless communication device 100 are provided.

The land electrodes 6a and 6b are preferably composed of the same conducting material as that of the radiation conductor 5. As illustrated in FIG. 1B, the land electrodes 6a and 6b are located in a center portion of the cutout portion B, more specifically, at a predetermined distance d1 from the edge 5a of the radiation conductor 5 toward the center of the radiation conductor 5. In addition, the land electrodes 6a and 6b are spaced apart from each other in the x direction by a distance d2 based on the interval between the external electrodes 29a and 29b included in the multilayer substrate 2. The above-described multilayer substrate 2 is mounted on the land electrodes 6a and 6b.

The inductance element 8 is located outside the multilayer substrate 2, and includes a first wiring pattern 8a and a second wiring pattern 8b, each of which has a line width W1. The wiring pattern 8a extends in the opposite direction of the arrow y from the land electrode 6a, and bends midway in the opposite direction of the arrow x so as to be connected to the radiation conductor 5. The wiring pattern 8b extends from the land electrode 6b in the opposite direction of the arrow y and parallel to the wiring pattern 8a, and bends midway in the forward direction of the arrow x so as to be connected to the radiation conductor 5.

The wiring patterns 8a and 8b and a portion surrounding the cutout portion B in the radiation conductor 5 define a loop 8c as represented by a dotted line in FIG. 1B.

Specifically, the loop 8c extends from the land electrode 6a through the wiring pattern 8a, the portion surrounding the cutout portion B in the radiation conductor 5, and the wiring pattern 8b to the land electrode 6b. In this configuration, when a high frequency signal (differential signal) is output from the external electrodes 29a and 29b of the multilayer substrate 2, a current loop is defined in the loop 8c.

As illustrated in FIG. 2, the resonant circuit 9 is a parallel resonant circuit constituted by the capacitance element included in the multilayer substrate 2 and the inductance element 8 located outside the multilayer substrate 2. The resonant circuit 9 is also a matching circuit that provides impedance matching between the wireless IC device 1 and the radiation conductor 5.

The resonant frequency of the resonant circuit 9 is substantially determined by the capacitance component and the inductance component of the resonant circuit. In the present preferred embodiment, a capacitance value C of the capacitance element 7 is dominant in the capacitance component, and an inductance value L of the inductance element 8 is dominant in the inductance component. One reason for this is that the inductance element 8 is located outside the multilayer substrate 2 so as to be spaced apart from the capacitance element 7. In other words, no stray capacitance is substantially generated between the wiring pattern 8a or the like in the inductance element 8 and the electrode pattern 21a or the like in the capacitance element 7. Therefore, the capacitance value C of the capacitance element 7 is dominant in the capacitance component.

Preferably, the capacitance value C and the inductance value L are determined so that the resonant frequency of the resonant circuit 9 is equal or substantially equal to the above-described carrier frequency. Thus, if the resonant circuit 9 has a resonant frequency which corresponds or substantially corresponds to the carrier frequency, the frequency of a high frequency signal received/transmitted at the radiation conductors 5 (that is, carrier frequency) can be substantially determined only in the resonant circuit 9 without frequency conversion in other circuits.

In the wireless communication device 100 having the configuration as described above, when information is to be transmitted, a high frequency signal generated in the wireless IC device 1 is transmitted via the resonant circuit 9 to the radiation conductors 5. The radiation conductors 5 radiate the high frequency signal to the antenna element of a communication target of the wireless communication device 100 (for example, a reader/writer). In the wireless communication device 100, when information is to be received, the radiation conductors 5 receive a high frequency signal radiated from an antenna element on the communication target side. The received high frequency signal is transmitted via the resonant circuit 9 to the wireless IC device 1.

The wireless communication device 100 includes the capacitance element 7 inside the multilayer substrate 2 and the inductance element 8 outside the multilayer substrate 2. Therefore, it is possible for the Q value of the inductance element 8 not to depend on the material of the dielectric substrates of the multilayer substrate 2. In addition, since the inductance element 8 is located outside the multilayer substrate 2, a desired inductance value can be obtained without narrowing the line width W1 of the wiring patterns 8a and 8b. Thus, the insertion loss of the inductance element 8 in the wireless communication device 100 can be reduced.

In the wireless communication device 100, when the multilayer substrate 2 is viewed in plan view in the arrow z direction, for example, the outline of the electrode portion of the electrode pattern 21a is present within the outline La of the electrode pattern 22a, and the electrode portion of the electrode pattern 21b is present within the outline Lb of the electrode pattern 22b (see FIG. 4A). Therefore, even when the dielectric layer 21 is slightly misaligned, the area in which the electrode pattern 22a overlaps the electrode pattern 21a is constant. Regarding this point, the same is true for the electrode pattern 22b and the electrode pattern 21b.

As understood from the foregoing description, in the capacitance element 7, even when the dielectric layer 21 is slightly misaligned, a capacitance between the electrode pattern 22a and the electrode pattern 21a and a capacitance between the electrode pattern 22b and the electrode pattern 21b are constant. Regarding this point, the same is true for each of the electrode patterns provided on a pair of adjacent dielectric layers in the arrow z direction. As described above, according to the present preferred embodiment, it is possible to provide the wireless communication device 100 including the capacitance element 7 in which a change in capacitance is small even when a dielectric layer is misaligned.

In the description of the present preferred embodiment, the outline of the electrode portion of each of the first electrode patterns is present within the outline La of the third electrode patterns, and the electrode portion of each of the second electrode patterns is present within the outline Lb of the fourth electrode patterns. In contrast, the outline of the electrode portion of each of the third electrode patterns may be present within the outline of the first electrode patterns, and the electrode portion of each of the fourth electrode patterns may be present within the outline of the second electrode patterns.

The capacitance element 7 is preferably provided in the multilayer substrate 2. In the capacitance element 7, an electric charge is accumulated by using not only the first to fourth electrode patterns but also the external electrodes 29a and 29b of the multilayer substrate 2 (see FIG. 5). Therefore, the capacitance value C of the capacitance element 7 provided in the multilayer substrate 2 can be increased. Thus, the size of the loop 8c included in the inductance element 8 can be reduced, enabling the area occupied by the loop 8c in the radiation conductor 5 to be reduced. Therefore, the size of the multilayer substrate 2 can be reduced, and the area for other circuit components in the PCB 4 can be increased.

If the multilayer substrate 2 includes an inductance element including a coil pattern or a meander pattern, magnetic coupling occurs between the inductance element including a coil pattern or the like and the loop 8c located on the radiation conductor 5 via mutual inductance depending on the position at which the inductance element is arranged. Misalignment of the mounting position of the multilayer substrate 2 on the PCB 4 causes variation in mutual inductance, resulting in variation in the resonant frequency of the resonant circuit 9. In the wireless communication device 100, the multilayer substrate 2 does not include an inductance element such as a coil, and no target for magnetic coupling with the loop 8c is present, resulting in no variation in the resonant frequency of the resonant circuit 9.

If the multilayer substrate 2 includes a coil pattern, the plane electrodes included in the multilayer substrate 2 prevent the coil from generating magnetic flux. As a result, the Q value of the coil is apt to be degraded. In the wireless communication device 100, since the multilayer substrate 2 does not include a coil for forming the resonant circuit, it is not necessary to consider such degradation of the Q value, and degradation of the operating Q of the resonant circuit can be also significantly reduced or prevented.

Modified Preferred Embodiments

Figure 6A:
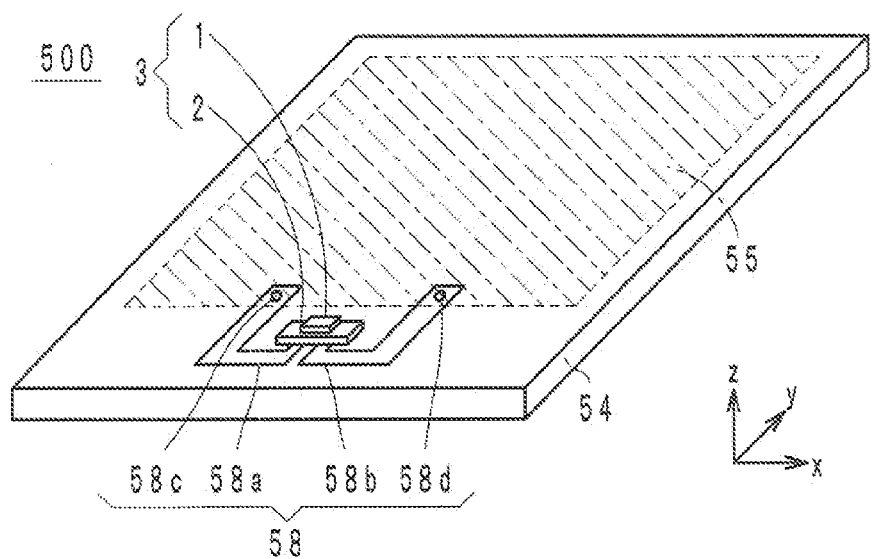
FIG. 6A is a perspective view illustrating a wireless communication device according to a modified preferred embodiment of the present invention.
Figure 6B:
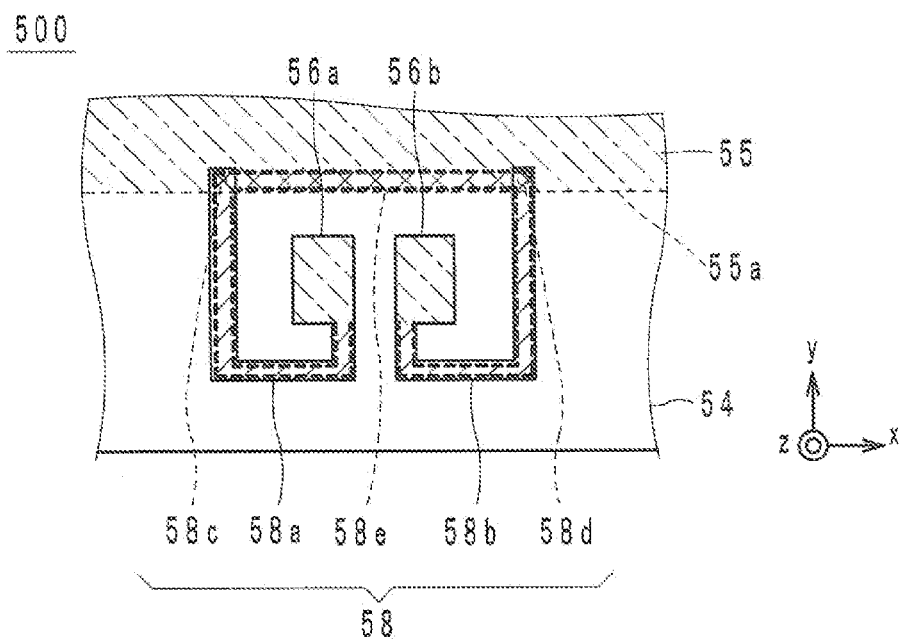
FIG. 6B is an enlarged view of a principal portion of the wireless communication device in FIG. 6A, viewed in a stacking direction.

Referring to FIGS. 6A and 6B, the wireless communication device 500 according to a modified preferred embodiment of the above-described preferred embodiment will be described in detail.

Compared with the wireless communication device 100, the wireless communication device 500 includes a PCB 54, a radiation conductor 55, first and second land electrodes 56a and 56b, and an inductance element 58, instead of the PCB 4, the radiation conductor 5, the first and second land electrodes 6a and 6b, and the inductance element 8. Other than that, no difference is present between the wireless communication devices 100 and 500. In FIGS. 6A and 6B, components corresponding to those in the configuration illustrated in FIGS. 1A and 1B are designated with identical reference numbers, and will not be described. For the sake of convenience, the first and second land electrodes 56a and 56b are not illustrated in FIG. 6A, and the feeding device 3 is not illustrated in FIG. 6B.

The PCB 54 is similar to the PCB 4 except that the PCB includes a multilayer body, for example, including multiple insulator layers. The radiation conductor 55 having a rectangular or substantially rectangular shape is provided between the insulator layers. Similarly to the above-described preferred embodiment, the radiation conductor 55 also functions as a ground conductor 55 for electronic components provided in the PCB 54.

The land electrodes 56a and 56b are preferably composed of the same conducting material as that of the radiation conductor 55, and are preferably formed on the principal surface (top surface) of the PCB 54 through, for example, printing. Specifically, in plan view in the arrow z direction, the land electrodes 56a and 56b are located at a predetermined distance in the opposite direction of the arrow y from an edge 55a of the radiation conductor 55. Similarly to the land electrodes 6a and 6b, the land electrodes 56a and 56b are arranged separately from each other in the x direction so that the multilayer substrate 2 can be mounted thereon.

The inductance element 58 is located outside the multilayer substrate 2, and includes a first loop conductor 58a and a second loop conductor 58b having a predetermined line width. The loop conductor 58a extends in the opposite direction of the arrow y from the land electrode 56a, and bends and extends in the opposite direction of the arrow x. Then, the loop conductor 58a further extends in the forward direction of the arrow y until it overlaps the radiation conductor 55 in plan view in the arrow z direction.

The loop conductor 58b extends in the opposite direction of the arrow y from the land electrode 56b, and bends and extends in the forward direction of the arrow x. Then, the loop conductor 58b further extends in the forward direction of the arrow y until it overlaps the radiation conductor 55 in plan view in the arrow z direction.

The above-described loop conductors 58a and 58b are electrically connected to the radiation conductor 55 located between the layers of the PCB 54 through first and second via hole conductors 58c and 58d.

The loop conductors 58a and 58b, the via hole conductors 58c and 58d, and the edge 55a of the radiation conductor 55 described above define a loop 58e as represented by the dotted line in FIG. 6B. Specifically, the loop 58e extends from the land electrode 56a through the loop conductor 58a, the via hole conductor 58c, the edge 55a, the via hole conductor 58d, and the loop conductor 58b to the land electrode 56b.

The above-described configuration also enables the inductance element 8 as in the above-described preferred embodiment to be provided.

In the foregoing description, the wireless communication devices 100 and 500 each are preferably an RFID tag. The present invention is not limited to this. The wireless communication devices 100 and 500 each may be installed in a reader/writer, for example. In the wireless communication devices 100 and 500, the ground conductors provided on/in the PCBs 4 and 54 are preferably used as the radiation conductors 5 and 55, respectively, for example. Thus, the sizes of the wireless communication devices 100 and 500 can be reduced. Accordingly, the wireless communication devices 100 and 500 are suitable to be installed in a communication device such as a cellular phone, for example.

It is not necessary for the wireless IC device 1 to be located on the top surface of the multilayer substrate 2. The wireless IC device 1 may be embedded in the multilayer substrate 2, or may be disposed at a location different from that of the multilayer substrate 2.

Instead of using also as a ground conductor provided on/in a corresponding one of the PCBs 4 and 54, each of the radiation conductors 5 and 55 may be a planar conductor located on/in, for example, a flexible substrate or a rigid substrate, and may have only functions as a radiation conductor. Other than that, as the radiation conductors 5 and 55, a metal case installed on the PCBs 4 and 54, the metal housing of a communication terminal, or the like may be used as a radiation conductor.

The wireless communication device according to various preferred embodiments of the present invention has an effect of enabling reduction in insertion loss or an effect of making it difficult for variation in capacitance to occur even when a dielectric layer is misaligned, and is suitable for an RFID tag or a reader/writer.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed as:

1. A wireless communication device comprising:
a wireless IC device;
a multilayer substrate defined by a multilayer body including a plurality of dielectric layers;
a resonant circuit connected to the wireless IC device, the resonant circuit including:
an inductance element; and
a capacitance element provided in the multilayer substrate; and
a radiation conductor connected to the resonant circuit; wherein
the capacitance element includes:
first and second electrode patterns located on at least one layer of the plurality of dielectric layers; and
third and fourth electrode patterns that are located on at least another layer of the plurality of dielectric layers and that are opposite the first and second electrode patterns;
the first and fourth electrode patterns have an identical potential, and the second and third electrode patterns have an identical potential; and
in plan view in a stacking direction of the plurality of dielectric layers, an outline of one of the first and third electrode patterns is present inside an outline of the other, and an outline of one of the second and fourth electrode patterns is present inside an outline of the other.

2. The wireless communication device according to claim 1, wherein the multilayer substrate includes first and second external electrodes on a back surface opposite a principal surface, the first and second external electrodes being arranged to connect the multilayer substrate to a printed circuit board;
the capacitance element includes first and second electrode patterns located on at least one layer of the plurality of dielectric layers, the first and second electrode patterns being opposite to the first and second external electrodes in the stacking direction of the plurality of dielectric layers; and
in plan view in the stacking direction, the first electrode pattern has the same or substantially the same outline dimensions as outline dimensions of the first external electrode, and the second electrode pattern has the same or substantially the same outline dimensions as outline dimensions of the second external electrode.

3. The wireless communication device according to claim 1, wherein the inductance element includes a loop defined by at least a portion of the radiation conductor.

4. The wireless communication device according to claim 1, wherein the wireless IC device inputs/outputs a high frequency signal obtained by modulating a carrier by using information, and a resonant frequency of the resonant circuit is equal or substantially equal to a frequency of the carrier.

5. The wireless communication device according to claim 1, wherein an inductance element constituted by a coil pattern that defines the resonant circuit is not provided in the multilayer substrate.

6. The wireless communication device according to claim 1, wherein the wireless IC device is mounted on a principal surface of the multilayer substrate.

7. The wireless communication device according to claim 2, wherein the radiation conductor defines a ground conductor located on/in the printed circuit board.

8. The wireless communication device according to claim 1, wherein the wireless communication device is an RFID tag or a reader/writer device.

9. The wireless communication device according to claim 1, wherein the radiation conductor is defined by a ground electrode or a metal case of the wireless communication device.

\* \* \* \* \*